Jan. 22, 1952  H. L. DINSMORE  2,582,969
GLASS CONDENSER
Filed March 25, 1948
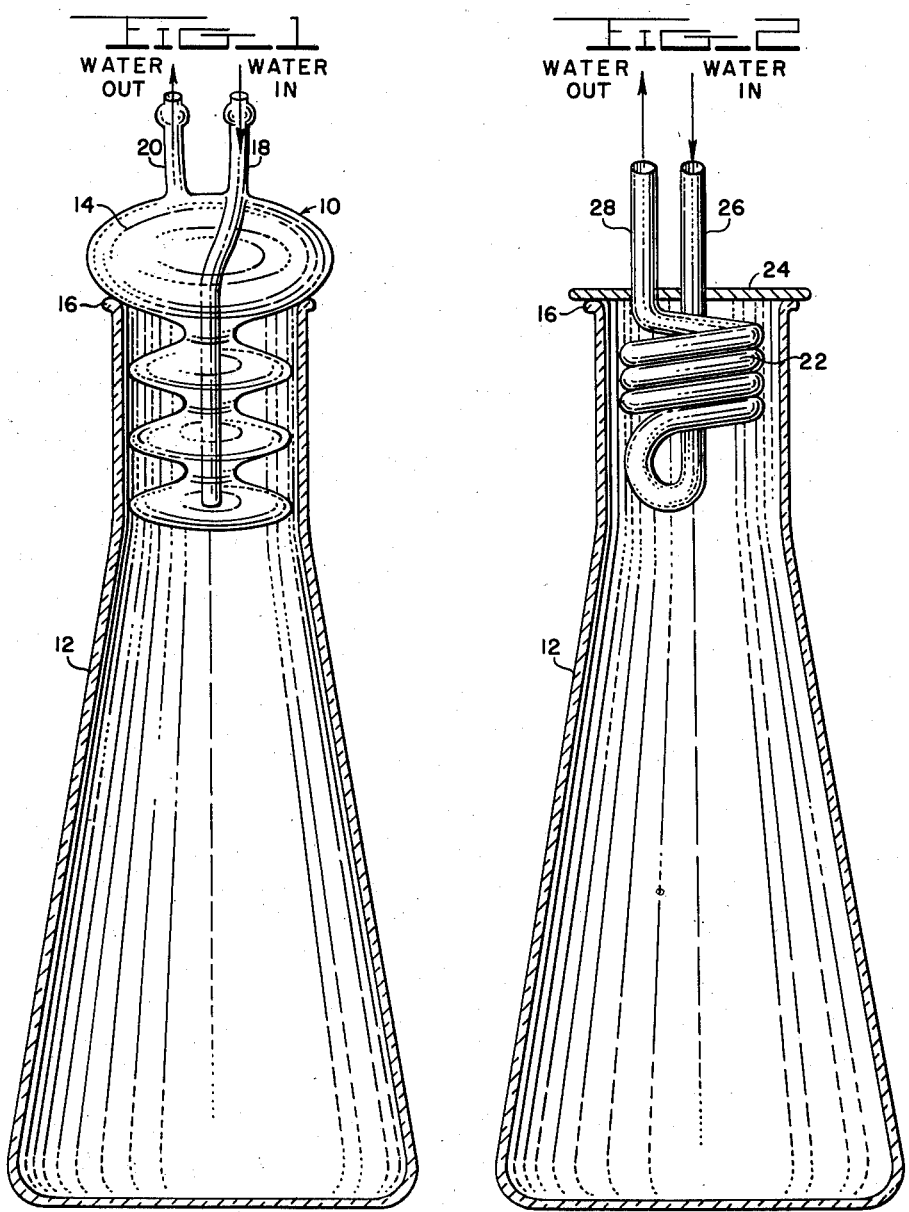
HOWARD L. DINSMORE Patented Jan. 22, 1952

2,582,969

UNITED STATES PATENT OFFICE 2,582,969

GLASS CONDENSER

Howard L. Dinsmore, St. Paul, Minn.

Application March 25, 1948, Serial No. 16,896

2 Claims. (Cl. 257—28)

(Granted under the act of March 3, 1883, as amended April 30, 1928; 370 O. G. 757)

This invention relates to chemical apparatus and in particular to a glass condenser which is adaptable for use in the recovery of volatile solvents.

The general object of the invention is to provide a condenser for use with chemical flasks for purposes of condensing vapors given off by the flask contents during a chemical or physical reaction.

Another object is to provide such a condenser as will be substantially inert with respect to any corrosive action of the vapor.

A further object is to provide such a condenser which will form a satisfactory seal by simple gravity contact with the rim of the flask.

It is the particular object of the invention to provide a new and improved condenser to replace a metal tube coil condenser presently used in the (tentative) A. S. T. M. assembly for the extraction and solution of rubbers, tars, bituminous materials, etc.

My condenser, being made of glass, is not subject to the corrosive action of the vapors, such as, for example, pyridine vapor, as is the metal tube condenser. Thus the possibility of contamination of the flask contents is substantially eliminated. A further advantage of my invention over the conventional apparatus is that my apparatus may be cleaned with oxidizing cleaning solutions, such as nitric acid, sulfuric acid, etc., whereas such cleaning treatment will quickly corrode the metal condensers. Also, a better seal or contact is obtained between condenser and flask when my condenser is used. This is due to both the material and the shape of the contact surface of my condenser.

In order that a clearer conception of my invention may be had reference is made to the drawings appended hereto wherein, as an illustration of a preferred embodiment of my invention, a side view of the aforementioned assembly with my condenser is shown in Fig. 1. The view is partly in elevation and partly in section. Similarly, a view of the assembly with the presently used metal condenser is shown in Fig. 2.

Referring to Fig. 1, my condenser 10 is shown generally in position for use with a modified Erlenmeyer flask 12. The condenser consists of an integrally formed and interconnected series of glass bulbs having the geometrical configuration of oblate spheroids and arranged along a longitudinal axis coincident with their respective minor axes. The largest bulb of the condenser 14, rests on the rim of the flask 16 and forms therewith a seal satisfactory for preventing the escape of vapors to the atmosphere. The rate of heat exchange is controlled by the circulation of a coolant through the condenser by means of the inlet and outlet tubes, 18 and 20, respectively.

In Fig. 2 the presently used metal tube condenser 22 is shown in position in the same type flask 12. The condenser is supported by a metal plate 24 through which pass the inlet and outlet tubes, 26 and 28, respectively. The metal plate rests on the rim 16 of the flask.

The applicant does not desire to be limited to the specific form or size of the condenser illustrated since variation in the number and size of the bulbs could be made without departure from the spirit or scope of the invention as defined by the herewith appended claims.

The invention described herein may be made and used by or for the Government of the United States of America for governmental purposes without the payment of any royalties thereon or therefor.

What is claimed is:

1. A glass condenser comprising an integral series of oblate spheroidal bulbs the first of which is of larger major axis than the others, said bulbs intercommunicating along the line of their respective minor axes for flow of a coolant therethrough, a coolant conduit communicating with the interior of said larger major axis bulb and a coolant conduit extending through said larger major axis bulb and communicating with the interior of the last bulb of said series.

2. A glass condenser comprising an integral series of oblate spheroidal bulbs the first of which is of larger major axis than the others, said bulbs intercommunicating along the line of their respective minor axes for flow of a coolant therethrough, a coolant conduit communicating with the interior of said larger major axis bulb and a coolant conduit extending through said series of bulbs and communicating with the interior of the last bulb in said series.

HOWARD L. DINSMORE.

REFERENCES CITED

The following references are of record in the file of this patent:

UNITED STATES PATENTS

| Number | Name | Date |
| --- | --- | --- |
| 2,182,564 | Leiboff | Dec. 5, 1939 |

OTHER REFERENCES

"Apparatus for Testing Petroleum Products," catalog No. 160, page 43, item 7836, Precision Scientific Co., Chicago, Ill.

"Laboratory Apparatus and Supplies," 1936 edition, page 243, Eimer and Amend, N. Y. C.